(12) United States Patent
Nobuta et al.

(10) Patent No.: US 6,869,731 B2
(45) Date of Patent: Mar. 22, 2005

(54) ELECTROLYTIC SOLUTION AND ELECTROCHEMICAL CELL USING THE SAME

(75) Inventors: Tomoki Nobuta, Miyagi (JP); Toshihiko Nishiyama, Miyagi (JP); Hiroyuki Kamisuki, Miyagi (JP); Gaku Harada, Tokyo (JP); Masato Kurosaki, Tokyo (JP); Yuji Nakagawa, Tokyo (JP); Shinako Kaneko, Miyagi (JP); Masaya Mitani, Miyagi (JP)

(73) Assignee: NEC Tokin Corporation, Miyagi (JP)

(*) Notice: Subject to any disclaimer, the term of this patent is extended or adjusted under 35 U.S.C. 154(b) by 0 days.

(21) Appl. No.: 10/271,636

(22) Filed: Oct. 15, 2002

(65) Prior Publication Data

US 2003/0091905 A1 May 15, 2003

(30) Foreign Application Priority Data

Oct. 17, 2001 (JP) .................................... 2001-319390

(51) Int. Cl.[7] ................................................ H01M 6/04
(52) U.S. Cl. ..................... 429/347; 429/199; 429/204
(58) Field of Search ................................. 429/347, 199, 429/204

(56) References Cited

U.S. PATENT DOCUMENTS 3,811,946 A * 5/1974 Creutz et al. ............... 429/347
4,536,262 A 8/1985 Wegner et al.
4,865,927 A 9/1989 Laig-Horstebrock et al.
6,120,696 A 9/2000 Armand et al.
2002/0068222 A1 * 6/2002 Ishii et al. .................. 429/347

FOREIGN PATENT DOCUMENTS

| EP | 0 684 620 A1 | 11/1995 |
|---|---|---|
| EP | 0 902 446 A2 | 3/1999 |
| EP | 1 193 781 A2 | 4/2002 |
| JP | 59-154778 * | 9/1984 |
| JP | 63-261680 A * | 10/1988 |
| JP | 2000-156329 | 6/2000 |
| JP | 2001-143748 | 5/2001 |
| RU | 2 025 835 C1 | 12/1994 |
| WO | WO 95/15572 | 6/1995 |

OTHER PUBLICATIONS

Thomas J. Richardson, et al., Overcharge Protection for Rechargeable Lithium Polymer Electrolyte Batteries, J. Electrochem. Soc. vol. 143, No. 12 Dec. 1996, pp. 3992–3996.

* cited by examiner

Primary Examiner—Laura Weiner
(74) Attorney, Agent, or Firm—Knobbe Martens Olson & Bear, LLP

(57) ABSTRACT

The present invention relates to an electrolytic solution comprising an aqueous solution of an organic or inorganic acid whereto a water-soluble N-containing heterocyclic compound is added, and an electrochemical cell such as a secondary battery and an electric double layer capacitor that uses such an electrolytic solution.

11 Claims, 4 Drawing Sheets

A : 0.5mol/L   B : 1.5mol/L
C : 2.0mol/L   D : 3.6mol/L

A : 0.5mol/L    B : 1.5mol/L
C : 2.0mol/L    D : 3.6mol/L

ELECTROLYTIC SOLUTION AND ELECTROCHEMICAL CELL USING THE SAME

BACKGROUND OF THE INVENTION

1. Field of the Invention

The present invention relates to an electrolytic solution used in an electrochemical cell such as a secondary battery and an electric double layer capacitor, and an electrochemical cell such as a secondary battery and an electric double layer capacitor that uses such an electrolytic solution; more specifically the present invention relates to an electrolytic solution to prevent the oxidation and degradation of electrode active materials, and to improve the cycle properties in a cell that includes a proton-conducting polymer as an active material.

2. Related Art

An electrochemical cell, such as a secondary battery and an electric double layer capacitor, that uses a proton-conducting polymer as an electrode active material (hereafter referred to as "cell") has been proposed and put to practical use. Such a cell has a constitution, for example as shown in FIG. 1, wherein a positive electrode 2 containing a proton-conducting polymer as the active material on a positive electrode collector 1, a negative electrode 4 on a negative electrode collector 3, and these are laminated via a separator 5; and only protons involve as electric charge carriers. An aqueous or non-aqueous solution containing a proton source is filled as an electrolytic solution. Reference numeral 6 denotes a gasket.

The electrodes are formed on collectors, such as a conductive rubber sheets, by slurry prepared from the powder of a doped or non-doped material polymer (proton-conducting polymer), a conducting additive, and a binder, which is put in a mold of a desired size and compressed with a hot press to have desired electrode density and film thickness. Thus formed positive electrode and negative electrode are arranged so as to face each other through a separator to constitute a cell.

Proton-conducting polymers used as electrode active materials include π-conjugated polymers, such as polyaniline, polythiophene, polypyrrole, polyacetylene, poly-p-phenylene, polyphenylenevinylene, polyperinaphthalene, polyfuran, polyfurfuran, polythienylene, polypyridinediyl, polyisothianaphthene, polyquinoxaline, polypyridine, polypyrimidine, polyindole, indole trimer, polyaminoanthraquinone, and derivatives thereof; and polymers containing hydroxyl groups (formed from quinone oxygen due to conjugation), such as polyanthraquinone and polybenzoquinone. Redox pairs are formed by doping an appropriate dopant to these polymers, and conductivity appears. By adequately adjusting oxidation-reduction potential difference, these polymers are selected and used as active materials for positive and negative electrodes.

As the electrolytic solution, an aqueous electrolytic solution comprising an aqueous solution of an acid, and a non-aqueous electrolytic solution based on an organic solvent have been known, and in proton-conducting polymers, the former aqueous electrolytic solution is exclusively used because the cell of a particularly high capacity can be provided. The acids include inorganic acids, such as sulfuric acid, nitric acid, hydrochloric acid, phosphoric acid, tetrafluoroboric acid, and hexafluosilicic acid; and organic acids, such as saturated monocarboxylic acids, aliphatic carboxylic acids, oxycarboxylic acids, p-toluene sulfonic acid, polyvinyl sulfonic acid, and lauric acid.

In a cell using such proton-conducting polymers as active materials, the cycle life is shortened by the rise of internal resistance, and this tendency becomes significant with the elevation of temperature. There is a problem of the degradation of long-term stability in a high-temperature atmosphere.

The causes are that the progress of proton adsorption-desorption reaction, which is the charge-discharge mechanism of electrode active materials, is deteriorated, the degrading atmosphere increases, the excessive oxidation of the materials is accelerated especially in high temperatures, and therefore, the progress of degradation increases. It is also the cause that the heat stability of the electrolytic solution is insufficient.

Particularly, the active materials for electrodes are easily degraded under oxidizing conditions. This is considered to be caused by degradation of the proton ($H^+$) adsorption-desorption reaction of active material compounds over time in the charge-discharge mechanism as described below. The contributing factors include the progress of degradation of active materials in an excessive $H^+$ concentration atmosphere compared with an optimal $H^+$ concentration (different between active materials and depending on the number of reactive electrons), whereby doping-dedoping reactivity between the active material and the electrolyte lowers, and reaction cannot proceed smoothly, and charge-discharge ability lowers (called "excessive oxidation degradation").

Here, an indole-based polymer (indole trimer) used as the active material for a positive electrode, and a quinoxaline-based polymer used as the active material for a negative electrode will be described.

The charge-discharge mechanism of the materials for positive and negative electrodes is shown in the following scheme:

[Positive Electrode]                    [Negative Electrode]

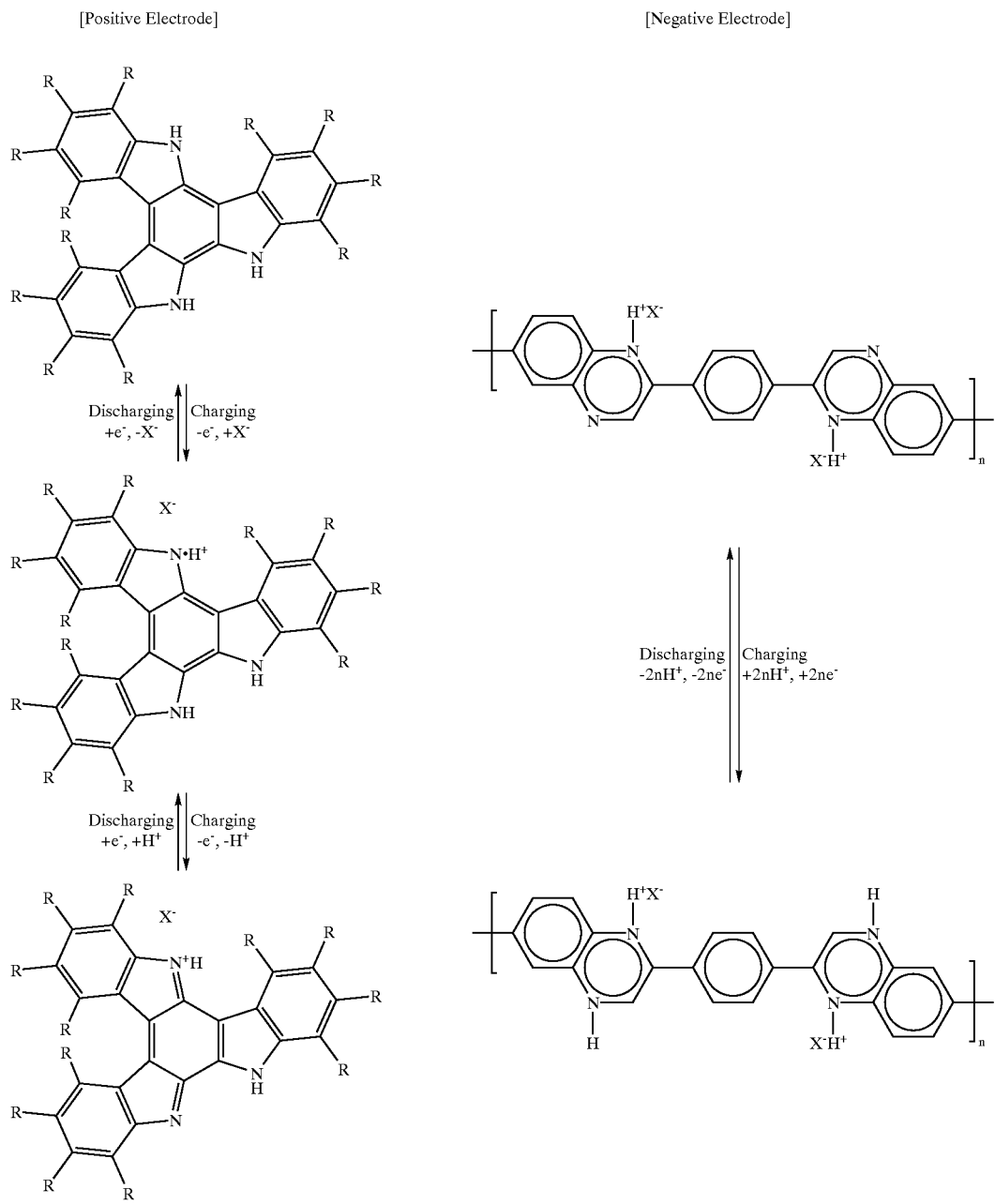

where R represents an optional substituent group, and X represents an anion.

Since this phenomenon is especially significant in a high acid concentration atmosphere (low pH), the degradation of the cycle properties is accelerated. Also, since the conductivity of the electrolyte increases, and the reaction with the active material is activated in a high temperature atmosphere, the progress of degradation by oxidation may be enhanced if the concentration of the electrolyte is excessive.

FIG. 2 is a graph showing change in cycle properties by the concentration of the electrolyte (sulfuric acid). As the graph shows, it can be seen that with increase in the concentration of the electrolyte, the capacity ratio lowers in larger number of cycles, and the cycle properties are degraded.

In an atmosphere of low-concentration of the electrolyte, although the cycle properties are satisfactory, the appearance capacities tend to lower. FIG. 3 is a graph showing change in the appearance capacities by the concentration of the electrolyte (sulfuric acid). As the graph shows, it can be seen that with decrease in the concentration of the electrolyte, the appearance capacities lower.

Therefore, the establishment of the optimal composition of the electrolyte ($H^+$ and $X^-$) is required, and this is the problem to improve the cycle properties.

SUMMARY OF THE INVENTION

The object of the present invention is to prevent the degradation by the oxidation of the active materials for electrodes, and to improve the cycle properties, without lowering appearance capacities in the cell containing a proton-conducting polymer as the active material.

The present inventors carried out repeated studies to solve the above-described problems, and found that the cell with improved cycle properties can be provided without lowering the appearance capacities, by adding a specific substance to the electrolytic solution filled in the cell. That is, the present invention is an electrolytic solution comprising an aqueous solution of an organic or inorganic acid whereto a water-soluble N-containing heterocyclic compound is added.

Also, the present invention is the electrolytic solution wherein the water-soluble N-containing heterocyclic compound is at least one compound selected from imidazole and the derivatives thereof represented by the following formula (1); triazoles and the derivatives thereof represented by the following formula (2) or (3); and pyrazole and the derivatives thereof represented by the following formula (4):

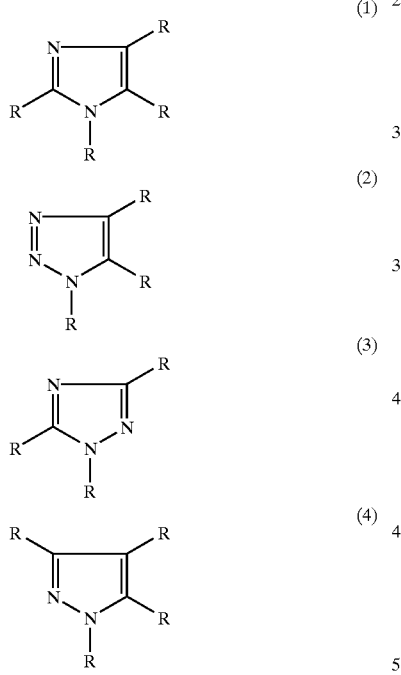

where R represents individually and independently a hydrogen atom, an alkyl group having 1 to 4 carbon atoms, an amino group, a carboxyl group, a nitro group, a phenyl group, a vinyl group, a halogen atom, an acyl group, a cyano group, a trifluoromethyl group, an alkyl sulfonyl group, or a trifluoromethylthio group.

It is preferable that the water-soluble N-containing heterocyclic compound is contained in the proportion of 1 to 80% by weight to 100% by weight of an electrolyte.

Also, the present invention relates to an electrochemical cell, such as a secondary battery and an electric double layer capacitor, comprising a positive electrode and a negative electrode facing each other in an electrolytic solution via a separator and a proton-conductive polymer, which is an active material of an electrode in the positive electrode and in the negative electrode in which only a proton participates in a charge/discharge, wherein the above-described electrolytic solution is used as the electrolytic solution.

By the use of the electrolytic solution of the present invention, as described above, the cycle properties have been improved without lowering appearance capacities. This is because the N-containing heterocyclic compound added to the electrolytic solution absorbs protons in the electrolytic solution, and makes the proton concentration in the electrolytic solution lower than the anion concentration, enabling the degradation of the active materials of electrodes by oxidation to be inhibited.

The use of the electrolytic solution of the present invention has the effect of improving the self-discharge properties and the withstand voltage properties. This is considered because a cation is resonance-stabilized by delocalization of the N-containing heterocyclic compound added to the electrolytic solution, and interacts with an anion in the electrolytic solution caused by electrochemical decomposition, inhibiting the production of gas due to the electrolysis of the electrolytic solution, and improving thermal stability of the electrolytic solution.

DETAILED DESCRIPTION OF THE PREFERRED EMBODIMENTS

Figure 1:
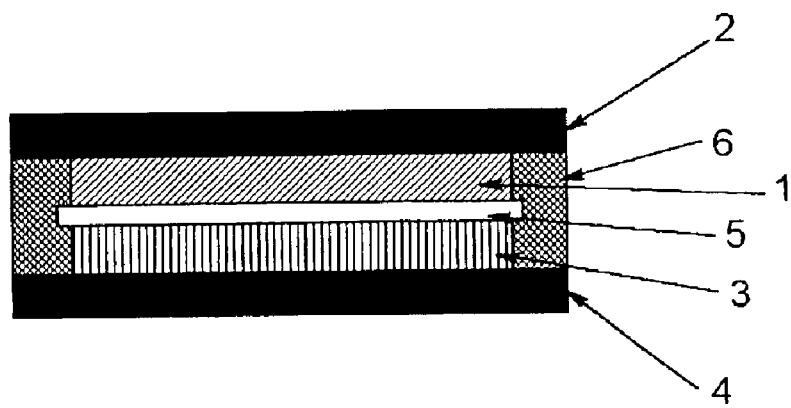
FIG. 1 is a sectional view showing an example of an electrochemical cell according to the present invention.
Figure 2:
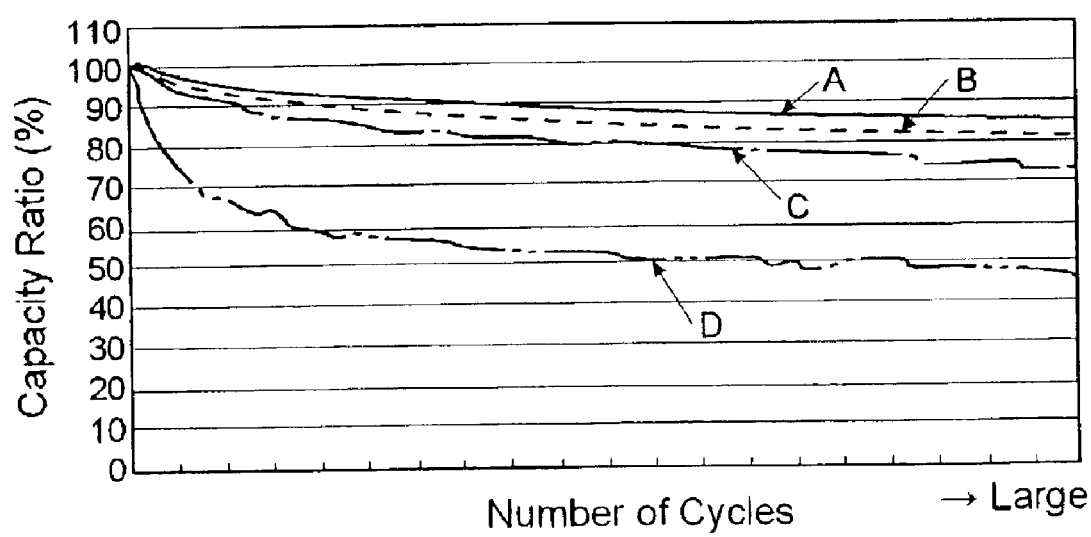
FIG. 2 is a graph showing change in cycle properties of a conventional electrochemical cell due to difference in the concentration of sulfuric acid.
Figure 3:
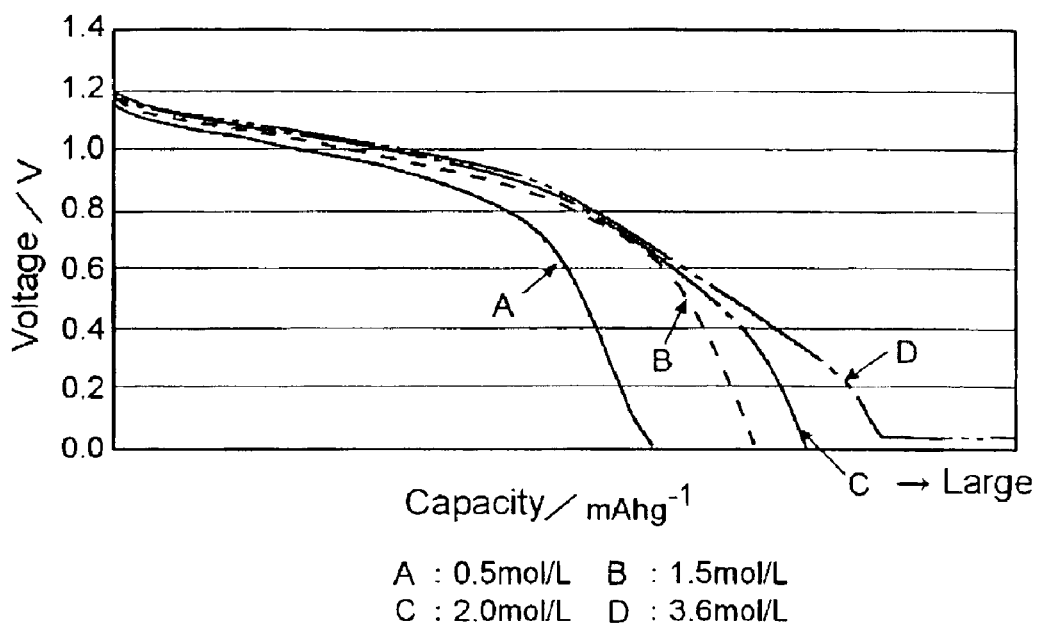
FIG. 3 is a graph showing change in appearance capacities of a conventional electrochemical cell due to difference in the concentration of sulfuric acid.

The present invention will be described in detail below.

The present invention is characterized in that a water-soluble N-containing heterocyclic compound is added to the electrolytic solution in order to control the ion concentration in the electrolytic solution that contributes to the doping-dedoping reaction. It is considered that the addition of the N-containing heterocyclic compound causes the following interactions. Here, the N-containing heterocyclic compound is exemplified by imidazole.

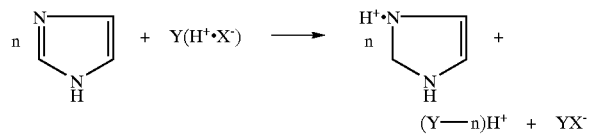

where n represents the concentration of imidazole, Y represents the concentration of the electrolyte, and X represents an anion.

As the above formula shows, imidazole adsorbs protons, the composition of the aqueous solution of the acid becomes $(Y-n)H^+$ and $XY^-$, and the quantity of protons in the electrolytic solution becomes less than the quantity of anions. As a result, the excessive oxidation of the active materials (for positive and negative electrodes) is prevented, and the cycle life is elongated. Thus, the concentration of anions to be a dopant does not change, and the concentration of protons can be adjusted as desired by controlling the quantity of the added N-containing heterocyclic compound. Thereby, the improvement of cycle properties can be realized while maintaining high appearance capacities.

Non-aqueous electrolytic solutions whereto an N-containing heterocyclic compound are disclosed in Japanese Patent Laid-Open Nos. 2000-156329 and 2001-143748.

Disclosed in Japanese Patent Laid-Open No. 2000-156329 is an electrolyte for aluminum electrolytic capacitors comprising a cation of a quaternized compound having N,N,N'-substituted amidine groups, and an organic acid anion in an organic solvent. While a conventional electrolytic solution using a quaternary ammonium salt of a carboxylic acid accelerates the degradation of a rubber sealant, and lowers the sealing performance significantly, the thermal stability and the specific conductivity of the electrolytic solution are improved by the addition of the cationic quaternary amidine. Particularly in a compound resulting from resonance stabilization of the cation due to electron delocalization in the amidine group, a high specific conductivity is presumably obtained by the promotion of ionic dissociation. Furthermore, when excessive hydroxide ions are produced as a result of the electrolysis reaction in the electrolytic solution, the hydroxide ion disappears rapidly owing to its reaction with the amidine group, and therefore, the effect of the electrolytic reaction can be minimized unlike conventional amines such as quaternary ammonium salts. As a result, the degradation of the sealant of the capacitor can be prevented, and the sealing performance can be enhanced.

On the other hand, disclosed in Japanese Patent Laid-Open No. 2001-143748 is an electrolytic solution used in non-aqueous electrolyte lithium secondary batteries, wherein a lithium salt of a perfluoroalkyl sulfonic acid derivative is dissolved in an organic solvent, and is characterized in containing at least one compound selected from heterocyclic compounds having one or more fluorine atom, and containing nitrogen or oxygen. In this reference, the heterocyclic compound added to the electrolytic solution forms a film of a strong adsorbing layer having resistance against the oxidation of the positive electrode collector on the positive electrode collector, to inhibit the degradation of the positive electrode collector by oxidation, and to improve the cycle properties.

The above-described two prior art techniques use non-aqueous electrolytic solutions, and differ from the aqueous electrolytic solution of the present invention. The reaction mechanism of these non-aqueous electrolytic solutions is entirely different from the degradation of the active materials for electrodes by oxidation of the cell using a proton-conducting polymer of the present invention, and in no way teaches anything to the present invention.

Figure 4:
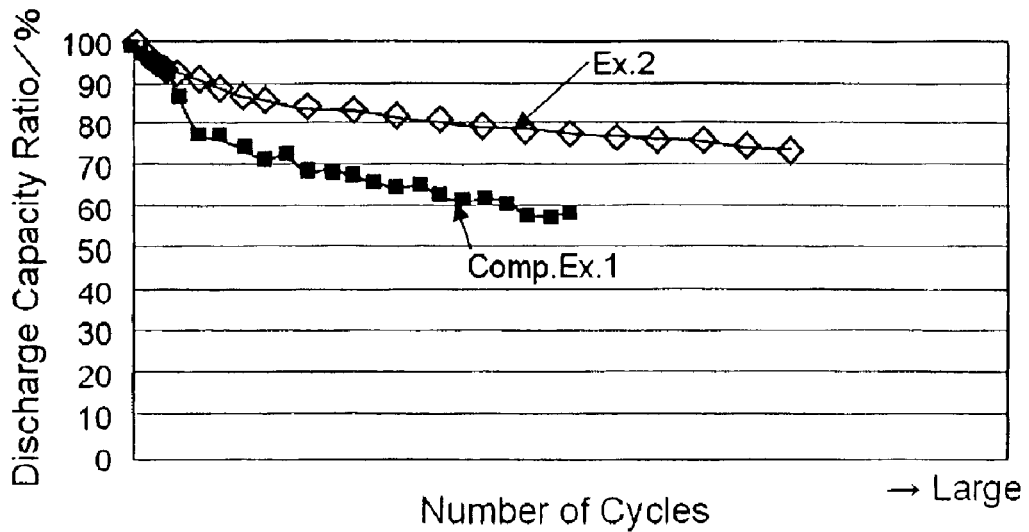
FIG. 4 is a graph showing the results of CV measurement of positive-electrode active materials in the electrolytic solution according to the present invention and a conventional electrolyte.

Next, in order to verify the effect for the prevention of degradation of the active materials, cyclic voltammmetry (CV) measurement was carried out on the active materials for the positive electrode (indol trimer) in the electrolytic solution of the present invention. In the measurement, the films of active materials for the positive electrode and the negative electrode formed on carbon sheets were used as working electrodes, platinum was used as the counter electrode, and an Ag/AgCl electrode was used as the reference electrode. The measurement temperature was 25° C., the scanning potential was 600 to 1100 mV, and the scanning speed was 1 mV/sec. The composition of Example 2, described later, that is, a 20% by weight aqueous solution of sulfuric acid whereto 20% by weight of imidazole to 100% by weight of sulfuric acid was dissolved was used as an electrolytic solution. For reference, the example whereto imidazole was not added (Comparative Example 1 described later) was also evaluated. The results are shown in FIG. 4.

As a result, the oxidation-reduction potential shifted to the low-potential side by several tens of millivolts, i.e., stable potential, which is the direction to relax degradation by oxidation.

Figure 5:
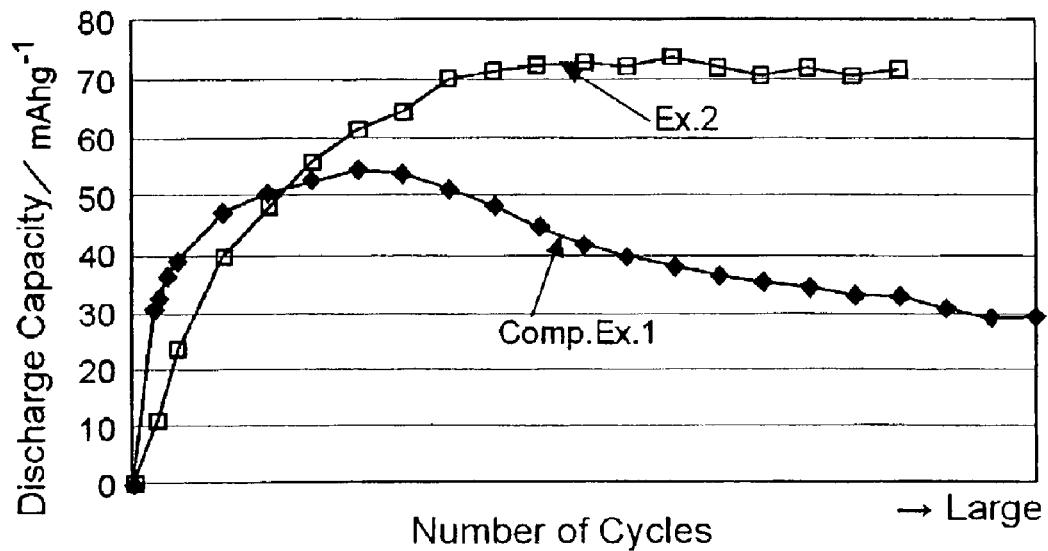
FIG. 5 is a graph showing the results of CV measurement of negative-electrode active materials in the electrolytic solution according to the present invention and a conventional electrolyte.

Similarly, the CV measurement was carried out on the active material for the negative electrode (polyphenyl quinoxaline), and change in the discharge capacity was measured. The results are shown in FIG. 5. These results showed that the degradation of not only the positive electrode, but also the negative electrode can be prevented.

In the electrolytic solution of the present invention, since pH changes accompanying the concentration of the added N-containing heterocyclic compound, the oxidation decomposition potential and the gas generation potential shift, and within the working voltage range of batteries (rating: 1.2 V/cell), the electrolytic solution having a sufficiently high electrical stability can be obtained.

In an N-containing heterocyclic compound, such as imidazole, electrons are delocalized on —N=C—N— in the ring thereof, and cations are resonance-stabilized as described below. It is considered that the resonance-stabilized cations interact with —OH$^-$ and —X$^-$ produced by electrochemical decomposition, and has the effect to inhibit the generation of gas by the electrolysis of the electrolyte. Furthermore, the thermal stability of the electrolytic solution is also improved.

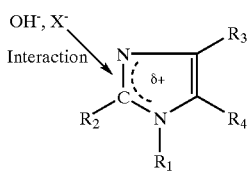

Since the present invention is an aqueous electrolytic solution, it is essential that the added N-containing heterocyclic compound is water-soluble. Although the number of nitrogen atoms in the ring is not limited, especially preferable compounds are at least one compound selected from imidazole and the derivatives thereof represented by the following formula (1); triazoles and the derivatives thereof represented by the following formula (2) or (3); and pyrazole and the derivatives thereof represented by the following formula (4). These N-containing heterocyclic compounds may be used alone, or may be the mixture of more than one.

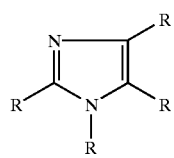
(1)

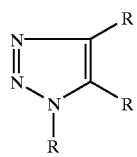
(2)

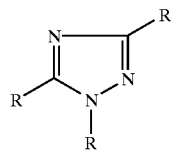
(3)

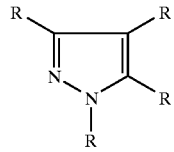
(4)

where R represents individually and independently a hydrogen atom, an alkyl group having 1 to 4 carbon atoms, an amino group, a carboxyl group, a nitro group, a phenyl group, a vinyl group, a halogen atom, an acyl group, a cyano group, a trifluoromethyl group, an alkyl sulfonyl group, or a trifluoromethylthio group.

Any proton-conducting polymers exemplified in the description of prior art can be used as the active materials for electrodes constituting the cell of the present invention. Preferably, the active materials for positive electrodes are selected from the group consisting of polyaniline, polydianiline, polydiaminoanthraquinone, polybiphenylaniline, polynaphthylaniline, indole trimer, and the derivatives thereof; and the active materials for negative electrodes are selected from the group consisting of polypyridine, polypyrimidine, polyquinoxaline, and the derivatives thereof. The particularly preferable is the combination of indole trimer and polyphenylquinoxaline.

The electrolyte containing in the electrolytic solution can be organic or inorganic acids described in the prior art, and the particularly preferable is sulfuric acid.

The quantity of the N-containing heterocyclic compounds added to the electrolytic solution can be selected optionally and is not limited to specific quantity; however, if the quantity is excessively small, the effect of preventing the degradation of active materials by oxidation may be small. On the contrary, if the quantity is excessively large, the appearance capacity may lower due to the elevation of pH, the conductivity of the electrolyte may lower (due to the elevation of pH), and other properties may also be deteriorated. Although it depends on the kind and concentration of the electrolyte, and the kind of the additives, the quantity of the N-containing heterocyclic compounds is preferably about 1 to 80% by weight to 100% by weight of the electrolyte.

The present invention will be described in detail below referring to examples; however, the present invention is not limited only to these examples. Although the application to secondary cells in the following examples will be described, the present invention can also be applied to the constitutions suitable for other electrochemical cells, such as electric double layer capacitors, by adjusting the capacities and the charge-discharge speed adequately.

EXAMPLE 1

As the positive electrode, a solid electrode formed from an indole trimer as the active material whereto 20% by weight of vapor-phase grown carbon fiber (VGCF) was added as a conducting additive, and 8% by weight of polyvinylidene fluoride (average molecular weight: 1100) was added as an electrode binder, stirred and mixed in a blender, and molded into a desired size with a hot press, was used.

As the negative electrode, a solid electrode formed from polyphenylquinoxaline as the active material whereto 25% by weight of carbon black (K.B. 600) was added as a conducting additive, stirred and mixed in a blender, and molded into a desired size with a hot press, was used.

As the electrolytic solution, a 20% by weight (2.3 mol/L) aqueous solution of sulfuric acid whereto 10% by weight (0.15 mol/L) of imidazole to 100% by weight of sulfuric acid was dissolved as an additive was used.

The above-described positive electrode and the negative electrode were bonded to face each other via a polyolefin-based porous film of a thickness of 20 to 50 μm as a separator to form a battery of the constitution shown in FIG. 1.

EXAMPLE 2

A battery was manufactured in the same manner as in Example 1 except that a 20% by weight (2.3 mol/L) aqueous solution of sulfuric acid whereto 30% by weight (0.45 mol/L) of imidazole to 100% by weight of sulfuric acid was dissolved as an additive was used as the electrolytic solution.

EXAMPLE 3

A battery was manufactured in the same manner as in Example 1 except that a 20% by weight (2.3 mol/L) aqueous solution of sulfuric acid whereto 50% by weight (0.75 mol/L) of imidazole to 100% by weight of sulfuric acid was dissolved as an additive was used as the electrolytic solution.

EXAMPLE 4

A battery was manufactured in the same manner as in Example 1 except that a 20% by weight (2.3 mol/L) aqueous solution of sulfuric acid whereto 30% by weight (0.45 mol/L) of triazole to 100% by weight of sulfuric acid was dissolved as an additive was used as the electrolytic solution.

EXAMPLE 5

A battery was manufactured in the same manner as in Example 1 except that a 20% by weight (2.3 mol/L) aqueous solution of sulfuric acid whereto 30% by weight (0.45 mol/L) of pyrazole to 100% by weight of sulfuric acid was dissolved as an additive was used as the electrolytic solution.

EXAMPLE 6

A battery was manufactured in the same manner as in Example 1 except that a 20% by weight (2.3 mol/L) aqueous solution of sulfuric acid whereto 15% by weight (0.225 mol/L) of imidazole and 15% by weight (0.225 mol/L) of triazole to 100% by weight of sulfuric acid was dissolved as an additive was used as the electrolytic solution.

EXAMPLE 7

A battery was manufactured in the same manner as in Example 1 except that a 20% by weight (2.3 mol/L) aqueous solution of sulfuric acid whereto 30% by weight (0.45 mol/L) of 3-trifluoromethyl-pyrazole to 100% by weight of sulfuric acid was dissolved as an additive was used as the electrolytic solution.

EXAMPLE 8

A battery was manufactured in the same manner as in Example 1 except that a 25% by weight (3.0 mol/L) aqueous solution of sulfuric acid whereto 78% by weight (1.15 mol/L) of imidazole to 100% by weight of sulfuric acid was dissolved as an additive was used as the electrolytic solution.

COMPARATIVE EXAMPLE 1

A battery was manufactured in the same manner as in Example 1 except that a 20% by weight (2.3 mol/L) aqueous solution of sulfuric acid was used as the electrolytic solution.

COMPARATIVE EXAMPLE 2

A battery was manufactured in the same manner as in Example 1 except that a 25% by weight (3.0 mol/L) aqueous solution of sulfuric acid was used as the electrolytic solution.

The appearance capacities, cycle properties, self-discharging properties, and withstand voltage properties of batteries manufactured in Examples 1 to 8 and Comparative Examples 1 and 2 were evaluated. The results are shown in Table 1 below.

The appearance capacities were evaluated making the appearance capacity of comparative Example 1 as to 100%. The cycle properties are change in capacities after 10,000 cycles of the test (temperature in measurement: 25° C.). The self-discharging properties are the capacity survival rate after one month test (temperature in measurement: 25° C.). The withstand voltage properties are change in the internal resistance after 1000 hours of the rated voltage impressing test (temperature in measurement: 60° C.).

The conditions of the cycle test were CCCV charging at 1 A and 1.2 V for 10 minutes, CC discharging at 0.2 A, and the ending voltage of 0.8 V.

TABLE 1

|  | Appearance capacity (%) | Cycle property (%) | Self-discharge property (%) | Withstand voltage property (%) |
| --- | --- | --- | --- | --- |
| Example 1 | 99.9 | 89.2 | 82.4 | 108 |
| Example 2 | 99.2 | 93.3 | 88.9 | 105 |
| Example 3 | 85.8 | 94.9 | 85.9 | 103 |
| Example 4 | 100.1 | 91.4 | 87.1 | 106 |
| Example 5 | 99.9 | 90.2 | 86.2 | 107 |
| Example 6 | 100.1 | 95.2 | 89.2 | 104 |
| Example 7 | 97.8 | 89.1 | 83.3 | 109 |
| Example 8 | 102.3 | 88.6 | 82.1 | 111 |
| Comparative Example 1 | 100.0 | 80.2 | 65.7 | 121 |
| Comparative Example 2 | 102.6 | 65.0 | 68.1 | 138 |

Figure 6:
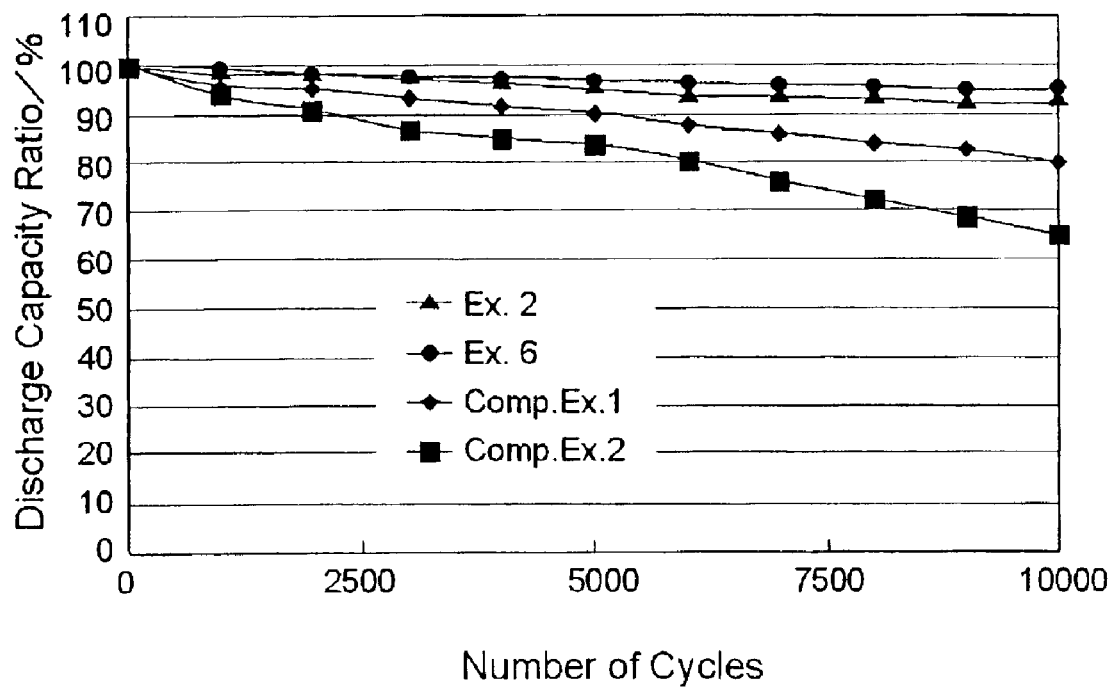
FIG. 6 is a graph showing change in cycle properties of cells using the electrolytic solutions according to the present invention (Examples 2 and 6) and the electrolytic solutions according to conventional examples (Comparative Examples 1 and 2).
Figure 7:
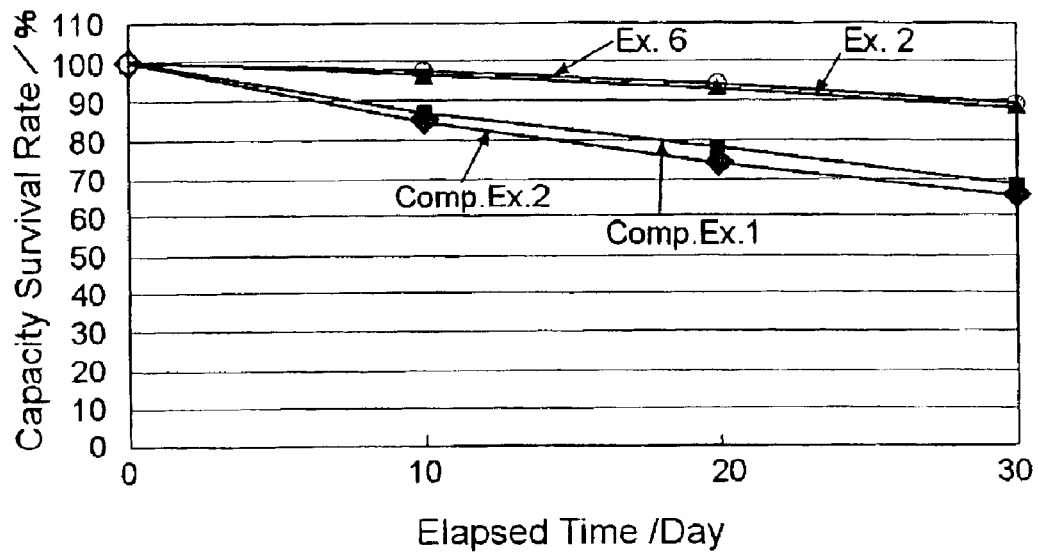
FIG. 7 is a graph showing the results of the self-discharge property tests of cells using the electrolytic solutions according to the present invention (Examples 2 and 6) and the electrolytic solutions according to conventional examples (Comparative Examples 1 and 2).
Figure 8:
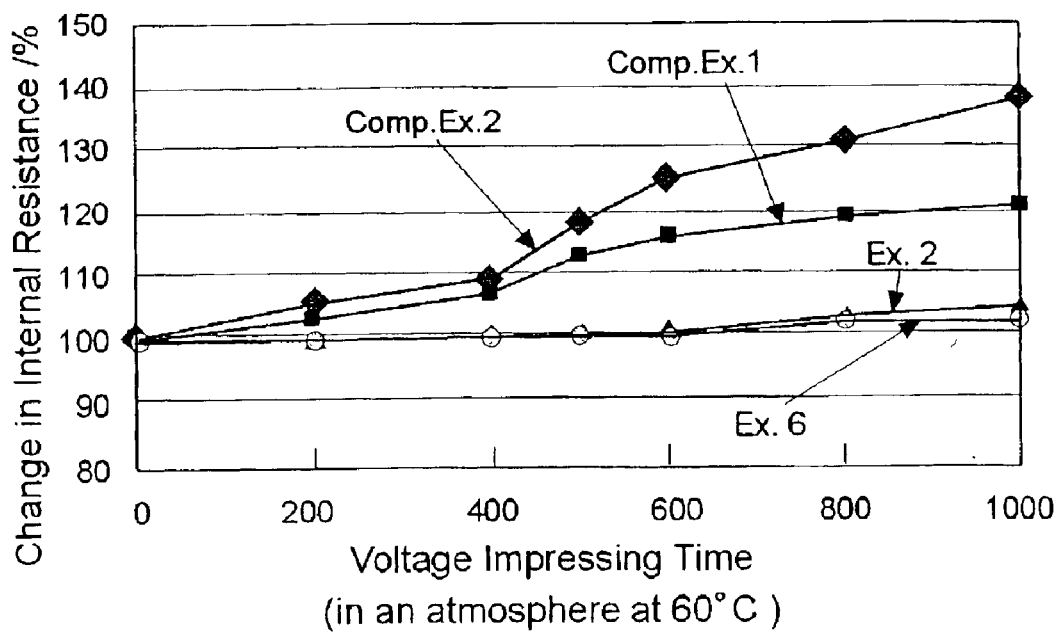
FIG. 8 is a graph showing the results of the withstand voltage tests of cells using the electrolytic solutions according to the present invention (Examples 2 and 6) and the electrolytic solutions according to conventional examples (Comparative Examples 1 and 2).

FIGS. 6 to 8 show the evaluation results of cycle properties, the self-discharge properties, and the withstand voltage properties of Examples 2 and 6, and Comparative Examples 1 and 2, respectively.

It can be seen from the above results that the use of the electrolytic solution of the present invention improves the cycle properties without lowering appearance capacities. It can be also seen that the use of the electrolytic solution of the present invention has the effect of improving the self-discharge properties and the withstand voltage properties.

Although the above-described examples use indole trimers and polyphenylquinoxane as active materials, the present invention is not limited thereto, but electrochemical cells using any proton-conducting polymers can be applied.

What is claimed is:

1. An electrolytic solution comprising an electrolyte which is an organic or inorganic acid, an additive which is a water-soluble N-containing heterocyclic compound, and a solvent which is water, wherein said water-soluble N-containing heterocyclic compound is at least one compound selected from imidazole and the derivatives thereof represented by the following formula (1); triazoles and the derivatives thereof represented by the following formula (2) or (3); and pyrazole and the derivatives thereof represented by the following formula (4):

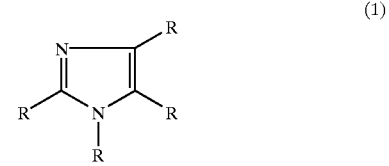

-continued

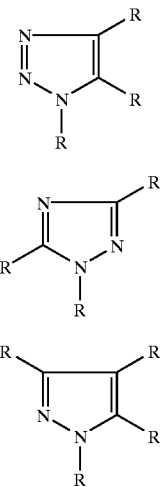

where R represents individually and independently a hydrogen atom, an alkyl group having 1 to 4 carbon atoms, an amino group, a carboxyl group, a nitro group, a phenyl group, a vinyl group, a halogen atom, an acyl group, a cyano group, a trifluoromethyl group, an alkyl sulfonyl group, or a trifluoromethylthio group.

2. The electrolytic solution according to claim 1, wherein the proportion of said water-soluble N-containing heterocyclic compound is 1 to 80% by weight to 100% by weight of the electrolyte in the electrolytic solution.

3. An electrolytic solution comprising an electrolyte which is an organic or inorganic acid, an additive which is a water-soluble N-containing heterocyclic compound, and a solvent which is water, wherein said water-soluble N-containing heterocyclic compound is at least one compound selected from imidazole and the derivatives thereof represented by the following formula (1); triazoles and the derivatives thereof represented by the following formula (2) or (3); and pyrazole and the derivatives thereof represented by the following formula (4):

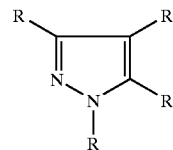

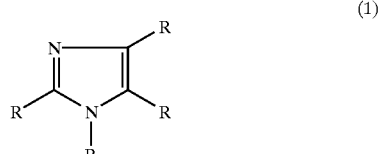

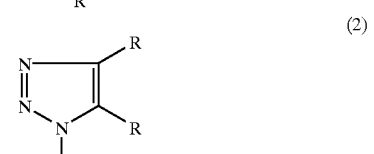

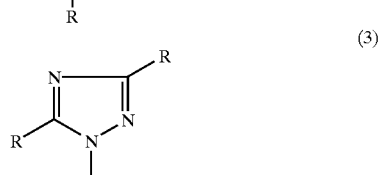

where R represents individually and indenendently a hydrogen atom, an alkyl group having 1 to 4 carbon atoms, an amino group, a carboxyl group, a nitro group, a phenyl group, a vinyl group, a halogen atom, an acyl group, a cyano group, a trifluoromethyl group, an alkyl sulfonyl group, or a trifluoromethylthio group, wherein said organic or inorganic acid is sulfuric acid.

4. The electrolytic solution according to claim 3, wherein the concentration of said sulfuric acid in the electrolytic solution is 10 to 40% by weight.

5. An electrochemical cell comprising a positive electrode and a negative electrode facing each other in an electrolytic solution via a separator, and a proton-conductive polymer, which is an active material of an electrode in the positive electrode and in the negative electrode in which only a proton participates in a charge/discharge, wherein an electrolytic solution comprising an aqueous solution of an organic or inorganic acid whereto a water-soluble N-containing heterocyclic compound is added, is used as the electrolytic solution.

6. The electrochemical cell according to claim 5, wherein said water-soluble N-containing heterocyclic compound is at least one compound selected from imidazole and the derivatives thereof represented by the following formula (1); triazoles and the derivatives thereof represented by the following formula (2) or (3); and pyrazole and the derivatives thereof represented by the following formula (4):

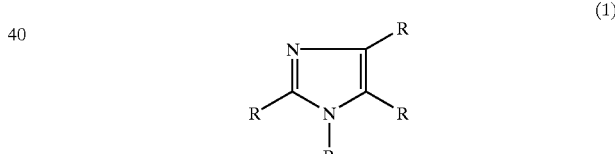

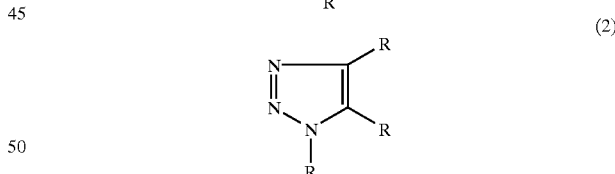

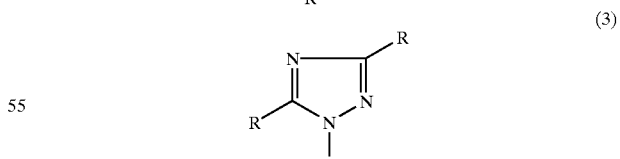

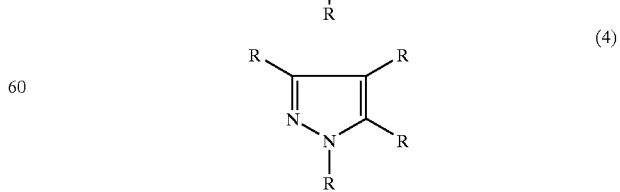

where R represents individually and independently a hydrogen atom, an alkyl group having 1 to 4 carbon atoms, an amino group, a carboxyl group, a nitro group, a phenyl group, a vinyl group, a halogen atom, an acyl group, a cyano group, a trifluoromethyl group, an alkyl sulfonyl group, or a trifluoromethylthio group.

7. The electrochemical cell according to claim 5, wherein the proportion of said water-soluble N-containing heterocyclic compound is 1 to 80% by weight to 100% by weight of an electrolyte in the electrolytic solution.

8. The electrochemical cell according to claim 5, wherein said aqueous solution of an acid contains sulfuric acid as an electrolyte.

9. The electrochemical cell according to claim 8, wherein the concentration of said sulfuric acid in the electrolytic solution is 10 to 40% by weight.

10. The electrochemical cell according to claim 5, wherein said electrochemical cell is a proton-conducting secondary battery.

11. An electrolytic solution in contact with an electrode made of a proton-conductive polymer, said solution comprising (i) a proton source which is an organic or inorganic acid, (ii) a proton-adsorption agent which is a water-soluble N-containing heterocyclic compound, and (iii) a solvent which is water, wherein said water-soluble N-containing heterocyclic compound is at least one compound selected from imidazole and the derivatives thereof represented by the following formula (1); triazoles and the derivatives thereof represented by the following formula (2) or (3); and pyrazole and the derivatives thereof represented by the following formula (4):

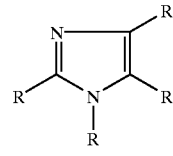

(1)

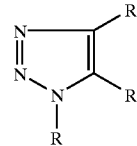

(2)

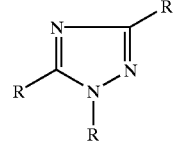

(3)

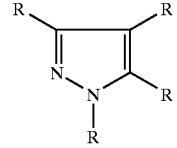

(4)

where R represents individually and independently a hydrogen atom, an alkyl group having 1 to 4 carbon atoms, an amino group, a carboxyl group, a nitro group, a phenyl group, a vinyl group, a halogen atom, an acyl group, a cyano group, a trifluoromethyl group, an alkyl sulfonyl group, or a trifluoromethylthio group.

* * * * *